3,211,615
ORAL ANTIDIABETIC COMPOSITION AND
METHOD OF USE
William M. McLamore, Kew Gardens, N.Y., assignor to Chas. Pfizer & Co., Inc., New York, N.Y., a corporation of Delaware
No Drawing. Original application May 20, 1957, Ser. No. 660,064. Divided and this application Aug. 29, 1961, Ser. No. 141,557
6 Claims. (Cl. 167—65)

This application is a divisional application of application Serial Number 660,064, as filed May 20, 1957.

This invention is concerned with a novel compound which is an excellent oral antidiabetic agent. In particular, it relates to a compound which exhibits superior hypoglycemic action clinically without possessing high toxicity, viz., N-(p-chlorobenzenesulfonyl)-N'-propylurea. This compound lowers the blood sugar level in both animals and humans to a considerable degree while toxic effects are either minimal or absent.

In accordance with the present invention it has been found that N-(p-chlorobenzenesulfonyl)-N'-sulfonylurea possesses a very high degree of hypoglycemic activity when administered orally to animals and is most effective for sustained activity. The screening method and the results obtained are described herein.

The high level of hypoglycemic activity of the new compound has been demonstrated in experimental animals. Intact male albino rats, each weighing approximately 160 g. (body weight) are used for blood sugar studies. The animals are fasted 24 hours prior to oral administration of the drug and are also without food during the experimental period. Blood sugars (as glucose) on tail blood samples are determined at 1, 3 and 5 hour intervals by the micro method of Folin-Malmros wherein alkaline ferricyanide is the oxidizing agent. Groups of control and treated rats are sacrificed after each determination. The treated animals are given a dosage of 300 mg./kg. (based on preliminary experiments for the optimal dosage in a 160 g. rat) suspended in 4 ml. of a 1% sodium carboxymethylcellulose solution; control rats are given the vehicle alone. Results are expressed as percent decrease in the fasting blood glucose value from the control pre-treatment value. N-(p-chlorobenzenesulfonyl)-N'-propylurea exhibits a marked lowering of the blood glucose in rats, i.e., at least a 30% decrease in blood glucose levels after three hours; this decrease is maintained for at least five hours.

Furthermore, dose response studies concerned with this compound have been performed using a total of 120 male albino rats, each weighing approximately 150 grams. Animals were fasted for 24 hours prior to administration of compound. Heparinized tail blood samples are taken before and 1, 3 and 5 hours after the oral administration and the glucose was determined in the usual manner. Doses are administered in a volume of 5 ml. per kg. of animal treated except for the 600 mg./kg. level which is on the basis of 8 ml. per kg. There are 10 rats per dosage level. Dosage levels are 50, 100, 300 and 600 mg./kg. body weight suspended in 1% sodium carboxymethylcellulose. Typical results obtained demonstrate that N-(p-chlorobenzenesulfonyl)-N'-propylurea possesses an unusual hypoglycemic effect on the blood sugar levels of rats.

Blood glucose levels in dogs are determined by the micro method of O. Folin and H. Wu as described in the Journal of Biological Chemistry, volume 41, page 367 (1920). All of the dogs studied in this instance were female mongrels in good health and free from infection. A total of 100 dogs have been examined on four dosage levels. The dogs are fasted 16 hours before the initial blood sample is taken as well as after administration of the compound of this invention (in capsule form); they remain without food during the entire experimental period. Blood sugars are run on starving controls at each blood sampling period so that changes in blood sugar due to starvation alone can be considered in evaluating the hypoglycemia induced. Oxalated blood samples are taken immediately and 1, 2, 4, 7, 24, 32, and 48 hours after treatment. Results obtained with N-(p-chlorobenzenesulfonyl)-N'-propylurea (dosage level of 100 mg./kg.) have shown the blood glucose level to be lowered by at least 40% after 32 hours. Urine samples are collected after 24 hours from individual dogs of the two test groups and examined microscopically for the presence of crystalluria; the findings in each case are negative.

Data illustrating the results of acute toxicity studies performed in conjunction with the clinical testing indicate this compound to be relatively non-toxic. For example, the $LD_{50}$ value, when N-(p-chlorobenzenesulfonyl)-N'-propylurea is administered orally to mice, is 1675 mg. per kg. of body weight, while in the rat, the $LD_{50}$ value is 2390 mg./kg. Furthermore, urine samples are collected 5 hours and 25 hours after oral administration and examined microscopically for the presence of crystalluria; the results are negative. Hence, it can be stated that N-(p-chlorobenzenesulfonyl)-N'-propylurea is extremely effective in reducing the blood sugar level in animals while it presents no evidence of kidney damage or crystalluria and has a comparatively low order of toxicity.

The blood sugar of adult humans is also lowered to a marked degree by use of this oral antidiabetic agent. The hypoglycemically active compound of this invention may be administered either alone or in combination with a diluent amount of a pharmaceutical carrier. In general, the usual dosage for administering this compound to humans is in the range of approximately 5–600 mg. per day in the order of about one to about five doses. This will vary somewhat with the weight of the person being treated. For purposes of oral administration, the compound may be administered in the form of a capsule as well as in the form of a tablet containing excipients such as starch and milk sugar; or it may be administered as an elixir or aqueous suspension in a carrier containing a sweetening or flavoring agent.

The preferred method of administration comprises the use of a rapidly disintegrable, palatable tablet comprising a plurality of compressed granules containing as the essential active ingredient N-(p-chlorobenzenesulfonyl)-N'-propylurea; the diluent amount of a pharmaceutically acceptable carrier comprises a plurality of compressed granules containing a sweetening agent bound therewithin by a sugar alcohol, and dispersed in the interstices between said granules a flavoring agent and a hydrophilic starch adapted to swell rapidly on contact with water, thereby disintegrating said tablet.

N-(p-chlorobenzenesulfonyl)-N'-propylurea is a crystalline substance melting at 129.2–129.8° C. It is insoluble in water and 20% acetic acid, but it is soluble in ethyl alcohol, benzene and 5% sodium carbonate. The preparation of this compound can be carried out by contacting p-chlorobenzenesulfonamide with propyl isocyanate as specifically described in Example I.

This invention is further illustrated by the following examples, which are not to be considered as imposing any limitation thereon.

*Example I*

A solution of 54 g. (0.64 mole) of propyl isocyanate in 60 ml. of anhydrous dimethylformamide was added to a cold, well-stirred suspension of 81 g. (0.42 mole) of dry p-chlorobenzenesulfonamide in 210 ml. of anhydrous triethylamine during the course of 20–30 minutes. The mildly exothermic reaction was completed by allowing it to stand at room temperature for about five hours. The reaction mixture was then slowly added to 3 liters of cold 20% acetic acid during the course of about one hour, constant agitation being maintained throughout the addition. After the addition was complete, the desired product, which had crystallized out, was filtered and washed well with about 2 liters of cold water. The crude material was then dissolved in 1 liter of cold 5% sodium carbonate and the resulting solution was immediately filtered from an insoluble gum. The product was then reprecipitated by slowly adding the filtrate to 3 liters of 20% acetic acid. The precipitate, which is very nearly pure N-(p-chlorobenzenesulfonyl)-N'-propylurea, was then dried and subsequently recrystallized from about 800 ml. of benzene to give a 55% yield of pure product, M.P. 129.2–129.8° C.

*Analysis.*—Calcd. for $C_{10}H_{13}O_3N_2ClS$: C, 43.40; H, 4.74; N, 10.12. Found: C, 43.19; H, 4.70; N, 10.32.

*Example II*

The tablets containing N-(p-chlorobenzenesulfonyl)-N'-propylurea were administered to each of a group of adult human subjects afflicted with diabetes; the group consisted of both males and females in the 40–80 age groups. An average dose of one to five tablets a day was administered orally, each tablet containing at least 250 mg. of active ingredient. The tablets employed were molded by compression in tablet machines. The diluent amount of a pharmaceutically acceptable carrier consisted of a sweetening agent, such as saccharin, bound therewithin by a sugar alcohol; it was moistened with alcohol and then forced through screens to form granules. There were then dispersed in the interstices between said granules a flavoring agent and a hydrophilic starch adapted to swell rapidly on contact with water, thereby disintegrating said tablet. The mixture was then completely dried before the tablets were punched.

It was found that a very good control of high blood sugar levels was obtained with N-(p-chlorobenzenesulfonyl)-N'-propylurea; the compound was quickly absorbed when given by mouth, with maximum blood levels occurring within three to six hours. In two to three hours following an oral dose, the blood sugar was observed to decrease in the majority of cases; this drug replaced injections entirely in patients who had been receiving as much as 100 units of insulin daily for a period up to 25 years. It was further discovered that for optimum results, a suitable dosage comprised 1.0 g. the first day, 0.6 g. the second day and 0.4 g. per day thereafter.

*Example III*

The same procedure as described in Example II was followed here except that gelatin capsules were used in place of tablets. The capsules employed were either of the hard filled or soft elastic type. In the hard filled type, one part of the capsule was filled with at least 250 mg. of N-(p-chlorobenzenesulfonyl)-N'-propylurea together with a diluent amount of an inert filler, such as lactose; the cap was then replaced and the capsule was ready for use. In the case of the soft elastic capsules, the same ingredients were deposited between layers of gelatin so prepared that when they are forced together under pressure they seal to afford an oval or spherical shaped capsule. In both cases, the results obtained were similar to those obtained with the tablet.

What is claimed is:

1. A process for the treatment of diabetes, which comprises orally administering a composition containing as the essential active ingredients N-(p-chlorobenzenesulfonyl)-N'-propylurea and a diluent amount of a pharmaceutically acceptable carrier.

2. A process for the lowering of blood sugar in the treatment of diabetes which comprises orally administering an effective amount of a composition having as the essential active ingredient N-(p-chlorobenzenesulfonyl)-N'-propylurea.

3. A process for the lowering of abnormally high blood sugar in animals which comprises orally administering an effective amount of a composition having as the essential active ingredient N-(p-chlorobenzenesulfonyl)-N'-propylurea.

4. A process for the lowering of blood sugar in the treatment of diabetic humans which comprises orally administering an effective amount of a composition having as the essential active ingredient N-(p-chlorobenzenesulfonyl)-N'-propylurea.

5. A tablet for oral administration in the lowering of blood sugar in the treatment of diabetes containing at least about 5 mg. of N-(p-chlorobenzenesulfonyl)-N'-propylurea and a pharmaceutical diluent.

6. A tablet for oral administration in the lowering of blood sugar in the treatment of diabetes containing at least about 5 mg. of N-(p-chlorobenzenesulfonyl)-N'-propylurea and a pharmaceutically acceptable sweetening agent together with a pharmaceutically acceptable tablet disintegrating agent.

References Cited by the Examiner

UNITED STATES PATENTS

| 2,371,178 | 3/45 | Martin | 260—553 |
| 2,968,158 | 1/61 | Ruschig et al. | 167—65 |
| 2,975,212 | 3/61 | Wagner et al. | 167—65 |
| 3,198,706 | 8/65 | Ruschig et al. | 167—65 |

FOREIGN PATENTS

| 993,465 | 10/51 | France. |
| 120,428 | 12/47 | Sweden. |

OTHER REFERENCES

Deutsche Medizinische Wochenschrift, volume 80, No. 40, pages 1449–1460, October 7, 1955.

Ehrhart: Die Naturiwissenschafter, Jahrg 43, Heft 4, 1956, second Febr. issue, report of the Congress of the German Society for Digestive and Metabolic Diseases, XVIII, Bad Homburg, from Oct. 3–5, 1955.

Manufacturing Chemists, volume 27, No. 5, May 1956, page 166.

Northey: The Sulfonamides and Allied Compounds, A.C.S. Monograph Series, No. 106, Reinhold Publishing Co., 1948, pages 251–254, 285–294, 422–430 and 633–635.

Science, volume 123, May 18, 1956, page 885.

FRANK CACCIAPAGLIA, JR., *Primary Examiner.*

MORRIS O. WOLK, IRVING MARCUS PAUL SABATINE, *Examiners.*